(12) United States Patent
Sugata et al.

(10) Patent No.: US 6,926,478 B2
(45) Date of Patent: Aug. 9, 2005

(54) SPINDLE DEVICE OF MACHINE TOOL

(75) Inventors: Shinsuke Sugata, Fukuyama (JP);
Tadashi Makiyama, Onomichi (JP)

(73) Assignee: Horkos Corp., Fukuyama (JP)

( * ) Notice: Subject to any disclaimer, the term of this patent is extended or adjusted under 35 U.S.C. 154(b) by 0 days.

(21) Appl. No.: 10/362,919

(22) PCT Filed: Aug. 20, 2001

(86) PCT No.: PCT/JP01/07134

§ 371 (c)(1),
(2), (4) Date: Feb. 27, 2003

(87) PCT Pub. No.: WO02/22307

PCT Pub. Date: Mar. 21, 2002

(65) Prior Publication Data

US 2003/0180111 A1 Sep. 25, 2003

(30) Foreign Application Priority Data

Sep. 1, 2000 (JP) .......................... 2000-265325

(51) Int. Cl.$^7$ .............................. B23C 9/00; B23Q 11/10
(52) U.S. Cl. ........................ 409/136; 409/232; 408/58; 408/59; 408/60
(58) Field of Search .................. 409/134, 135, 409/136, 137; 408/57, 58, 59, 60, 61

(56) References Cited

U.S. PATENT DOCUMENTS

| 5,004,382 A | * | 4/1991 | Yoshino | 408/60 |
| 5,160,229 A | * | 11/1992 | Yoshino | 408/59 |
| 5,649,714 A | * | 7/1997 | Uchida et al. | 409/136 |
| 5,676,506 A | * | 10/1997 | Sugata | 409/136 |
| 5,690,137 A | * | 11/1997 | Yamada | 409/136 |
| 6,050,756 A | * | 4/2000 | Buchholz et al. | 409/136 |
| 6,305,696 B1 | * | 10/2001 | Sugata et al. | 408/57 |
| 6,410,160 B1 | * | 6/2002 | Landin et al. | 428/613 |
| 6,582,167 B1 | * | 6/2003 | Sugata et al. | 409/136 |

FOREIGN PATENT DOCUMENTS

| JP | 9-239637 A | 9/1997 | |
| JP | 11-235641 A | 8/1999 | |
| JP | 2000-158285 A | 6/2000 | |
| JP | 2001-18147 A | 1/2001 | |
| JP | 2001-18148 A | 1/2001 | |
| WO | WO 9714530 A1 | * 4/1997 | ............ B23Q/1/00 |

* cited by examiner

Primary Examiner—Erica Cadugan
Assistant Examiner—Dana Ross
(74) Attorney, Agent, or Firm—Merek, Blackmon & Voorhees, LLC

(57) ABSTRACT

A spindle device of a machine tool capable of stably injecting atomized cutting fluid from the tip of a tool device 13 when a variation in fluidity of the atomized cutting fluid occurs temporarily in atomized cutting fluid passages e1, e2 or the supply of the atomized cutting fluid into the atomized cutting fluid passage e1 is stopped and restarted, wherein the atomized cutting fluid passages e1, e2 having a single passage cross section are formed in the area ranging from the spindle 1 to the tip of the tool device 13 through the atomized cutting fluid passages e1, e2, and a vacant chamber group transmission layer part 14 having a large number of vacant chambers 142 stacked thereon in multiple stages or in the state of communicating with each other and allowing the atomized cutting fluid to pass therethrough through the groups of the vacant chambers 142 is formed in the atomized cutting fluid passage e1 or e2.

13 Claims, 11 Drawing Sheets

SPINDLE DEVICE OF MACHINE TOOL

FIELD OF THE INVENTION

The present invention relates to a spindle device of a machine tool, which ejects atomized cutting fluid from the tip of a tool device.

BACKGROUND OF THE INVENTION

In machining a machine tool, much cutting fluid is supplied to the machining point to cool and lubricate a workpiece or a tool device, or to remove cutting chips. In this case, there happen many problems such as environmental pollution and a bad influence to human health due to cutting fluid, a big cost accompanying waste oil disposal of the cutting fluid, a decrease in the tool device life by cooling of the workpiece, and sliding wear of the tool device due to an excess of cutting fluid during fine cutting machining. In addition, because much cutting fluid adheres to the cutting chips during machining, the adhered cutting fluid must be removed from the cutting chips in treating or recycling.

To settle these problems, recently, a machine tool that carries out so-called dry cutting has appeared. The dry cutting is what cuts the machining point as supplying a very small quantity of atomized cutting fluid.

The applicant has already put in operation a machine tool that carries out the dry cutting. Here, a spindle device of the machine tool, as shown in FIG. 11, involves a tool holder 4 fixing a tool device 13 is on a spindle 1 through a taper-shank part 5b thereof.

In this case, a straight holder side atomized cutting fluid passage e2 having a single passage cross section is provided to the tool holder 4. The passage e2 comprises a central hole "d" of a pull-stud 6, an inner hole "f" of a holder inside connecting pipe 8 and a tool device inside passage "g" provided to the thickness of the tool device 13. Besides, a spindle side atomized cutting fluid passage e1 comprising an inner hole of an inner pipe 3 is provided to the spindle 1. Here, the inner pipe 3 is provided to a rotating center of the spindle 1, having a single passage cross section.

While the tool device is machining, atomized cutting fluid generated by an atomized cutting fluid generator provided near the spindle 1 is supplied to the base of the passage e1. Then, the atomized cutting fluid passes through the passage e1, thereafter spouting from the tip of the tool holder 13 through the passage e2.

In the above-mentioned conventional machine tool, the rotating speed of the spindle 1 varies according to the operating circumstance When the rotating speed becomes large, the centrifugal force acting on the atomized cutting fluid flowing inside the passages e1 and e2 increases. Therefore, the pressure of the atomized cutting fluid near the inner peripheral surface of the passages e1 and e2 ascends; thereby promoting the liquefaction thereof as well as inhibiting a stable supply thereof. Accordingly, there occur various bad influences such as a reduction in the tool device life and the machining surface quality.

While the machine tool operates, the supply of the atomized cutting fluid is frequently stopped and re-started to avoid a useless supply. When the supply is stopped, the atomized cutting fluid inside the passages e1 and e2 escapes instantly. Accordingly, when the supply of the atomized cutting fluid is restarted, unless the passages e1 and e2 are filled with the atomized cutting fluid, a stable supply circumference is not accomplished and efficient operation is also hindered.

The present invention aims to provide a spindle device of a machine tool that can settle the above-mentioned troubles.

SUMMARY OF THE INVENTION

To achieve the above-mentioned purpose, the invention is characterized by a spindle device of a machine tool comprising a spindle, a tool device installed thereon integrally, atomized cutting fluid passages each having a single passage cross section and a vacant chamber group transmission layer part provided in the middle of either of the atomized cutting fluid passages. Here, the atomized cutting fluid passages are provided in the area ranging from the spindle to the tip of the tool device. Atomized cutting fluid supplied from the spindle side spouts from the tip of the tool device through the atomized cutting fluid passages. A vacant chamber group transmission layer part is formed so that a large number of vacant chambers are stacked in multiple stages or in the state of communicating with each other, and the atomized cutting fluid is allowed to pass therethrough.

Here, the atomized cutting fluid flowing inside the atomized cutting fluid passages is a pressure fluid, spouting from the tip of the tool device through the vacant chamber group transmission layer part. In this case, the vacant chambers of the vacant chamber group transmission layer part function as an atomized cutting fluid passage as well as an atomized cutting fluid accumulating space.

That is, when the atomized cutting fluid smoothly flows inside the atomized cutting fluid passages, the pressure of the atomized cutting fluid inside the vacant chamber group transmission layer part becomes high in comparison with the case that it the atomized cutting fluid does not flow smoothly. Therefore, when the atomized cutting fluid with high pressure passes through each vacant chamber, it is accumulated therein.

On the other hand, when the atomized cutting fluid liquefies inside the atomized cutting fluid passages, it does not flow smoothly because the rotating speed of the spindle becomes temporarily large. Here, the pressure of the upstream side of the vacant chamber group transmission layer part becomes low. Therefore, the atomized cutting fluid becomes hard to flow into the vacant chamber group transmission layer part temporarily. In this case, the atomized cutting fluid with comparatively high pressure accumulated in each vacant chamber escapes from an exit side of the vacant chamber temporarily and flows toward the downstream side, and then acts so as to make up for the deficiency of atomized cutting fluid.

Besides, when the supply of the atomized cutting fluid from the spindle side is stopped, the atomized cutting fluid or the liquefied cutting fluid decreasing in pressure inside the atomized cutting fluid passages remains in the vacant chambers of the vacant chamber group transmission layer part. In the first stage when the atomized cutting fluid is again supplied from the spindle side, the cutting fluid remaining in the chambers is pushed out by propagation of the pressure wave of the atomized cutting fluid supplied to the upstream side, acting so that shortage of cutting fluid may be compensated.

The invention is made definite as follows.

That is, the vacant chambers are composed so as to communicate with each other through comparatively small entrances. According to this, when the atomized cutting fluid of the downstream side of the vacant chamber group transmission layer part decreases in pressure, the atomized cutting fluid inside the vacant chambers slowly escapes from the atomized cutting fluid entrances. Therefore the time per action of compensating a shortage of atomized cutting fluid leaving for the tip of the tool device is extended.

Besides, the vacant chamber group transmission layer part is made of sintered metal. According to this, the vacant chamber group transmission layer part having a large number of vacant chambers stacked thereon in the state of communicating with each other is formed easily and durably.

Moreover, the vacant chamber group transmission layer part is provided inside a tool holder that fixes the tool device on the spindle. According to this, complication of the inside structure of the spindle side is prevented.

Or instead of the structure just described the vacant chamber group transmission layer part may be provided inside the spindle. According to this, conventional various tool devices installed on the spindle and their associated members can be used as they are. Therefore, production costs of the vacant chamber group transmission layer part become cheap in comparison with the case in which the vacant chamber group transmission layer part is provided to each of the various tool devices and their associated members.

In this case, an atomized cutting fluid generator to generate the atomized cutting fluid can be provided inside the spindle, and the vacant chamber group transmission layer part can be provided between the atomized cutting fluid generator and the tool holder.

According to this, the atomized cutting fluid passages are shortened, thereby decreasing in liquefaction amount. Therefore, the atomized cutting fluid through the vacant chamber group transmission layer part is efficiently stabilized.

BRIEF DESCRIPTION OF THE DRAWINGS

FIG. 1A is a sectional view from a side sight, and FIG. 1B is an enlarged sectional view showing an important part of the spindle device.

FIG. 2A is a sectional view from a side sight, and FIG. 2B is a partly enlarged view.

FIG. 3A is a sectional view from a side sight, and FIG. 3B is a partly enlarged view.

FIG. 4A is a sectional view from a side sight, and FIG. 4B is a partly enlarged view.

FIG. 5A is a sectional view from a side sight, and FIG. 5B is a partly enlarged view.

FIG. 6A is a sectional view from a side sight, and FIG. 6B is a partly enlarged view.

FIG. 7A is a sectional view from a side sight, and FIG. 7B is a partly enlarged view.

FIG. 8A is a sectional view from a side sight, and FIG. 8B is a partly enlarged view.

FIG. 9A is a sectional view from a side sight, and FIG. 9B is a partly enlarged view.

PREFERRED EMBODIMENT OF THE INVENTION

The first embodiment of the invention will be explained.

Figure 1:
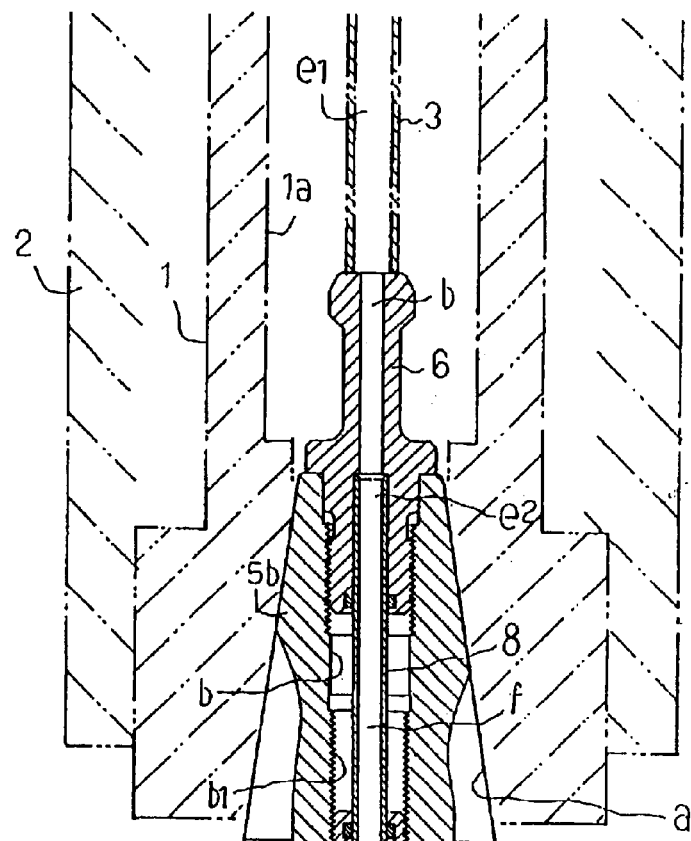
FIG. 1 illustrates a spindle device of a machine tool concerning the first embodiment of the invention.
Figure 1:
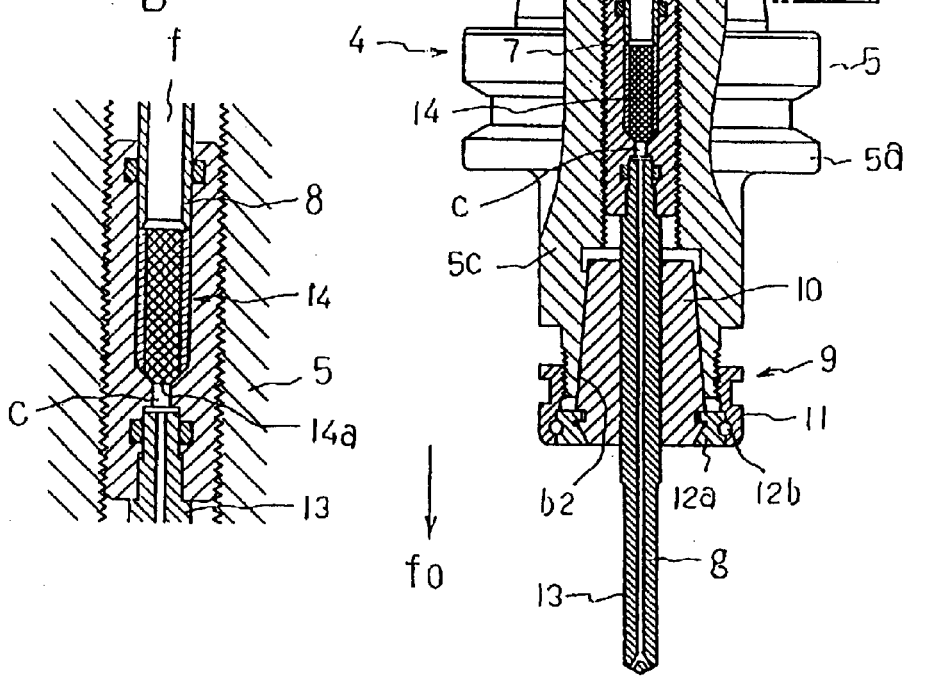

In FIG. 1, 1 is a bar spindle, which is supported on a spindle support frame 2 of a machine tool by not-illustrated bearings so as to freely rotate around the center thereof. The spindle 1 has a central hole $1a$ whose tip forms into a taper hole "a". An inner pipe 3 is fixed at the center of the central hole $1a$ integrally with the spindle 1.

Numeral 4 is a tool holder that is attached and detached by a tool exchange device. Here, the middle of a holder body 5 forms into a flange part $5a$, the posterior part from the flange part $5a$ into a shank part $5b$, and the anterior part therefrom into a round bar-shape anterior overhang part $5c$, respectively. Besides, the holder body 5 has an inner hole "b" at the center. A pull-stud 6 screws on the rear end of the inner hole "b". A female screw b1 is formed on the comparatively long range of the anterior part of the inner hole "b", and a taper hole b2 is formed on the forefront part thereof Here, an adjusting screw 7 having a male screw on the peripheral surface is screwed into the female screw b1.

The adjusting screw 7 has an inner hole "c" whose posterior part is connected to a central hole "d" of the pull-stud 6 through a holder inside connecting pipe 8.

A collet fastener 9 is provided to the tip of the overhang part $5c$. The fastener 9 comprises a collet 10 that is inserted into the taper hole b2 of the holder body 5, a fastening nut 11 that is screwed on the tip of the overhang part $5c$, and ring-shape coupling members 12 and 12 that combine the nut 11 with the collet 10 relatively-movably in a circumferential direction of the collet 10. A tool device 13 is inserted into the central hole of the collet 10. The rear end of the tool device 13 is inserted into the anterior part of the inner hole "c" of the adjusting screw 7, thereby supporting the tool device 13 under a rearward displacement restriction. Besides, the tool device 13 body is firmly fixed to the center of the holder body 5 by the fastener 9.

The tool holder 4 is firmly installed on the spindle 1 because the taper-shank part $5b$ is closely inserted into the taper hole "a" and the pull-stud 6 is drawn rearward by a not-illustrated clamping mechanism provided to the central hole $1a$.

In this state, the tip of the inner pipe 3 contacts closely on the rear end surface of the pull-stud 6.

In the above-mentioned construction, an inner hole of the inner pipe 3 serves as a spindle side atomized cutting fluid passage e1. Besides, the central hole "d" of the pull-stud 6, an inner hole "f" of the connecting pipe 8, the inner hole "c" of the adjusting screw 7 and a tool device inside passage "g" formed to the thickness of the tool device 13 serve as a tool holder side atomized cutting fluid passage e2.

A vacant chamber group transmission layer part 14, which is characteristic in this invention, is provided between the front end of the connecting pipe 8 and the rear end of the tool device 13 within the inner hole "c" of the adjusting screw 7 in the middle of the passage e2. As shown in FIG. 1B, the transmission layer part 14 forms a columnar member $14a$ to be closely inserted into the inner hole "c" of the adjusting screw 7. A large number of vacant chambers are stacked thereon in multiple stages or in the state of communicating with each other and the atomized cutting fluid passes therethrough.

In this case, the columnar member 14a is made with about 2 to 10 mm in the diameter. Besides, each vacant chamber has a very small cross section area in comparison with the passage e2, as well as a comparatively small entrance for atomized cutting fluid in comparison with the vacant chamber. Such a columnar member cuts and forms a lump of sintered metal closely having tiny cavities.

In use of the above-mentioned spindle device, when atomized cutting fluid is needed, a supply start instruction is given to a control section of the machine tool. In connection with this, the atomized cutting fluid with pressure of about 0.3 MPa is supplied to the rear end of the passage e1 from a not-illustrated atomized cutting fluid generator provided near the spindle device. The atomized cutting fluid reaches the interior of the passage e2, spouting from the tip of the tool device 13 through the connecting pipe 8, the transmission layer part 14 and the passage "g". On the other hand, when the atomized cutting fluid is not needed, a supply stop instruction is given to the control section of the machine tool. In connection with this, the supply of the atomized cutting fluid from the atomized cutting fluid generator to the passage e1 is stopped.

Another embodiment is explained in order below. In this case, in the explanation and each drawing relevant to each embodiment, the same sign shall be used for the substantial same parts as the above-mentioned parts.

Figure 2:
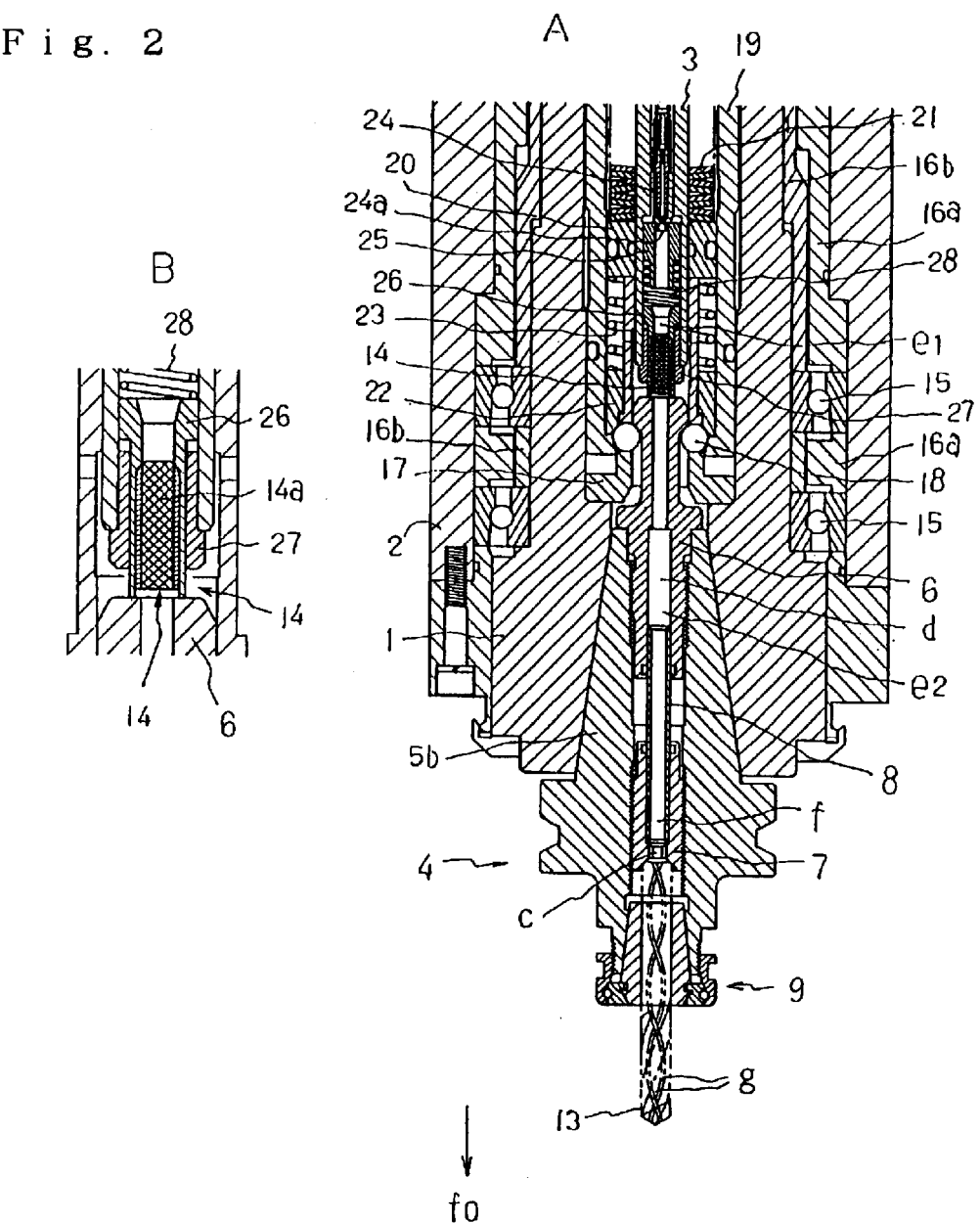
FIG. 2 illustrates a spindle device of a machine tool concerning the second embodiment of the invention.

The second embodiment of the invention will be explained. FIG. 2 is a sectional view from a side sight, which illustrates a spindle device of a machine tool regarding this embodiment.

In the figure, bearings 15, 15 and spacers 16a, 16a are provided between the spindle 1 and the spindle support frame 2. The bearings 15, 15 support the spindle 1 rotatively and the spacers 16a, 16a regulate the relative position of the spindle 1, the spindle support frame 2 and the bearings 15, 15.

Numeral 17 is a canister inserted into the anterior parallel part of the central hole 1a of the spindle 1, which has one or more through holes in a radial direction on the peripheral wall. A ball member 18 is guided inside each of the through holes movably in the radial direction of the peripheral wall. To the peripheral wall of the canister 17, is extrapolated a cylindrical clamp rod 19 guided to the central hole 1a of the spindle 1 movably in a longitudinal direction. When the clamp rod 19 moves to the front f0 to the spindle 1, the ball member 18 can move outside the radial direction of the spindle. Conversely, when the clamp rod 18 moves backward to the spindle 1, the ball member 19 is pushed and moved inside the radial direction of the spindle by the tip of the clamp rod 19 compulsorily.

A spring receptive ring member 20 is fitly inserted into the rear end surface of the canister 17 between the inner pipe 3 and the clamp rod 19. The ring member 20 is pressed to the rear end surface of the canister 17 by a compressed disk spring group 21 installed therebehind, keeping the position.

A pressing ring member 22, which presses the ball member 18 with the slanting surface, is fitly inserted into the anterior part between the canister 17 and the clamp rod 19 movably in a longitudinal direction to the clamp rod 19. A compressed spring 23 is installed between the ring member 22 and the ring member 20. The ball member 18 is pressed inside the radial direction of the spindle by the spring 23. This pressure acts so as to support suitably lest the tool holder 4 should come out the spindle 1 by its own weight when the clamp rod 19 moves to the front f0 to the spindle 1.

An atomized cutting fluid generator 24 is provided somewhat to the interior within the inner hole of the inner pipe 3. Cutting fluid and compressed air are independently supplied to the generator 24 through the inner hole of the inner pipe 3 therebehind. The generator 24 mixes and stirs the cutting fluid and the compressed air to generate and eject atomized cutting fluid from an opening 24a of the front end thereof.

The anterior part from the generator 24 within the inner hole of the inner pipe 3 forms a somewhat large diameter. A cylindrical compressed air supply valve 25 is inserted near the front of the generator 24 within the anterior part movably in a longitudinal direction. Besides, an extended connecting pipe member 26 is installed inside the tip of the anterior part of the inner pipe 3 through an omission preventing cylindrical member 27 movably in a longitudinal direction within the fixed limits. Moreover, a compressed spring 28 is provided between the connecting pipe member 26 and the valve 25.

In this case, the spring 28 presses the valve 25 backward as well as the connecting pipe member 26 to the front f0. When the pressure inside the anterior part of the inner pipe 3 goes down, the valve 25 moves to the front and the compressed air of the generator 24 side is blown into the inner hole of the valve 25.

Here, the tool holder 4 is made with the structure that a vacant chamber group transmission layer part 14 is removed in the above-mentioned embodiment.

In the above-mentioned construction, when installing the tool holder 4 separated from the spindle 1 thereon, the taper-shank part 5b of the tool holder 4 is pushed into the taper hole "a" of the spindle 1 under the clamp rod 19 moving to the front f0. Therefore, the pull-stud 6 pushes and displaces the ball member 18 outside the radial direction of the spindle, and then advances to the position shown in FIG. 2 to the canister 17. After this advance, the clamp rod 19 is drawn and moved backward. Therefore, the ball member 18 is pushed inside the radial direction of the spindle, so that the tension of the clamp rod 19 is communicated to the pull-stud 6. Accordingly, the tool holder 4 is firmly fixed on the spindle 1.

On the other hand, when separating the tool holder 4 fixed on the spindle 1 therefrom, the tool holder 4 is drawn to the front f0 under the clamp rod 19 moving to the front f0. Therefore, the pull-stud 6 pushes and displaces the ball member 18 outside the radial direction of the spindle against the spring 23, and then gets out to the front.

In the above-mentioned construction, the anterior part from the generator 24 within the inner hole of the inner pipe 3 serves as a spindle side atomized cutting fluid passage e1. The central hole "d" of the pull-stud 6, the inner hole "f" of the connecting pipe 8, the inner hole "c" of an adjusting screw 7 and the tool device inside passage "g" provided to the thickness of the tool device 13 serve as the tool holder side atomized cutting fluid cutting fluid passage e2.

The above-mentioned technical method is almost equal to what was disclosed on the prior application by this applicant (Japanese Patent Application No. 196231 of 1999).

In this embodiment, the transmission layer part 14 is provided between the generator 24 and the tool holder 4 within the spindle 1. The transmission layer part 14 is what the columnar member 14a such as the above-mentioned embodiment is innerly fitted and fixed to the front end part of the inner hole of the connecting pipe member 26.

While the tool holder 4 is fixed on the spindle 1, the front end surface of the columnar member 14a is pushed and moved a little backward against the spring 28 by the pull-stud 6, and then closely pressed to the rear end surface of the pull-stud 6 by the spring 28. In this case, the vacant chambers of the columnar member 14a communicate the passage e1 of the spindle 1 side to the passage e2 of the tool holder 4 side.

On the other hand, while the tool holder 4 is drawn from the spindle 1, the columnar member 14a is pushed to the front by the spring 28 together with the connecting pipe member 26. Here, the columnar member 1 4a moves to an anterior regulated position of the moving range of the connecting pipe member 26.

In use of the above-mentioned spindle device, when the atomized cutting fluid is needed, a supply start instruction is given to the control section of the machine tool. In connection with this, the compressed air and the cutting fluid are supplied from the outside of the spindle device to the generator 24 inside the spindle 1. Therefore, the generator 24 supplies atomized cutting fluid with pressure of about 0.3 MPa into the passage e1. The atomized cutting fluid shortly reaches the interior of the passage e2 through the transmission layer part 14, spouting from the tip of the tool device 13 through the connecting pipe 8 and the passage "g". On the other hand, when the atomized cutting fluid becomes useless, a supply stop instruction is given to the control section of the machine tool. In connection with this, the supply of the compressed air and the cutting fluid to the generator 24 is stopped. Therefore, the generator 24 stops generating atomized cutting fluid and the supply of the atomized cutting fluid to the passage e1 is also stopped.

Figure 3:
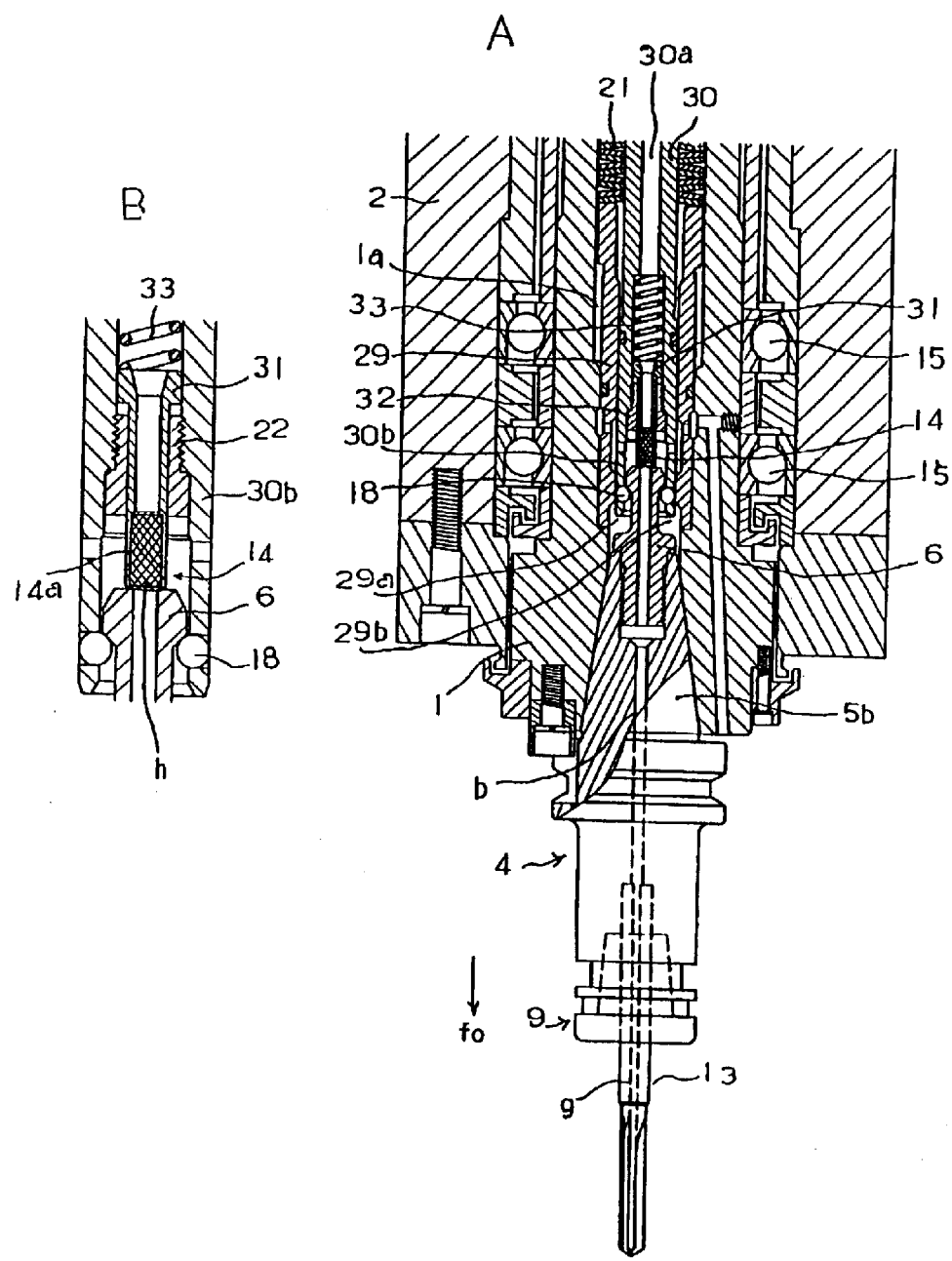
FIG. 3 illustrates a spindle device of a machine tool concerning the third embodiment of the invention.

Next, the third embodiment of the invention will be explained. FIG. 3 is a sectional view, which illustrates a spindle device of a machine tool concerning this embodiment.

As shown in the figure, a canister guide cylindrical member 29 is innerly fitted closely to the foremost parallel part of the central hole 1a of the spindle 1. And a clamp rod 30 is inserted into an inner hole of the guide cylindrical member 29 movably in a longitudinal direction. The clamp rod 30 has a central hole 30a. And the front of the clamp rod 30 forms into a canister part 30b. One or more through holes in the radial direction of the spindle are provided to a peripheral wall of the front end of the canister part 30b. A ball member 18 is inserted into each of the through holes movably in the radial direction of the spindle.

The compressed disk spring group 21 is inserted behind the guide cylindrical member 29 within the central hole 1a of the spindle 1. The spring group 21 presses the guide cylindrical member 29 to the front, and simultaneously the clamp rod 30 toward a posterior regulated position within the longitudinal moving range. Therefore, the guide cylindrical member 29 remains at a position shown in FIG. 3A within the spindle 1.

An extended connecting member 31 is provided to the central hole 30a behind the canister part 30b of the clamp rod 30. The connecting member 31 is guided through an omission preventing ring member 32 screwed into the central hole 30a movably in a longitudinal direction within the fixed limits, and besides, pressed to the front f0 by a compressed spring 33 installed behind the ring member 32.

The tool holder 4 is made what the central hole "d" of the pull-stud 6 and the tool device inside passage "g" are connected by the inner hole "b" of the holder body 5.

In the above-mentioned construction, when installing the tool holder 4 separated from the spindle 1 thereon, the taper shank part 5b of the tool holder 4 is pushed into the taper hole 1a of the spindle 1 under the clamp rod 30 moving to the front f0. Therefore, the pull-stud 6 pushes and moves the ball member 18 outside the radial direction of the spindle, and then advances to a position shown in FIG. 3A to the guide cylindrical member 29. In this case, the clamp rod 30 moves to the front f0 until the ball member 18 is located inside a front large-diameter part 29a of the inner hole of the guide cylindrical member 29. Then, the clamp rod 30 is drawn backward. Therefore, the ball member 18 is pushed inside the radial direction of the spindle by a slanting surface 29b behind the large-diameter part 29a and fitted in a necking part of the clamp rod 6, and then communicates a backward tension to the pull-stud 6. Accordingly, the tool holder 4 is fixed on the spindle firmly.

On the other hand, when separating the tool holder 4 fixed on the spindle 1 therefrom, the tool holder 4 is drawn to the front f0 under the clamp rod 30 moving to the front f0. Therefore, the pull-stud 6 pushes and moves the ball member 18 outside the radial direction of the spindle, and then gets out to the front f0.

In the above-mentioned construction, the central hole 30a of the clamp rod 30 and a part of the inner hole of the connecting pipe 31 serve as a spindle side atomized cutting fluid passage e1. Besides, the central hole "d" of the pull-stud 6, the inner hole "b" of the holder body 5 and the passage "g" provided to the thickness of the tool device 13 serve as a tool holder side atomized cutting fluid passage e2.

In the third embodiment as well as the second embodiment, the transmission layer part 14 is provided inside the spindle 1. The transmission layer part 14 is what the columnar member 14a such as the first embodiment is innerly fitted and fixed to the front end part of the inner hole of the connecting pipe member 31.

While the tool holder 4 is fixed on the spindle 1, the front end surface of the connecting pipe 31 is pushed and moved a little backward against the spring 33 by the pull-stud 6, and then closely pressed to the rear end surface of the pull-stud 6 by the spring 33. Here, the vacant chambers of the transmission layer part 14 connect the passage e1 to the passage e2.

On the other hand, while the tool holder 4 is drawn from the spindle 1, the columnar member 14a is pressed to the front f0 by the spring 33 together with the connecting pipe member 31. Here, the columnar member 14a moves to the position corresponding to an anterior regulated position of the moving range of the connecting pipe member 31.

In use of the above-mentioned spindle device, the supply of the atomized cutting fluid and so on is carried out in accordance with the first embodiment.

Figure 4:
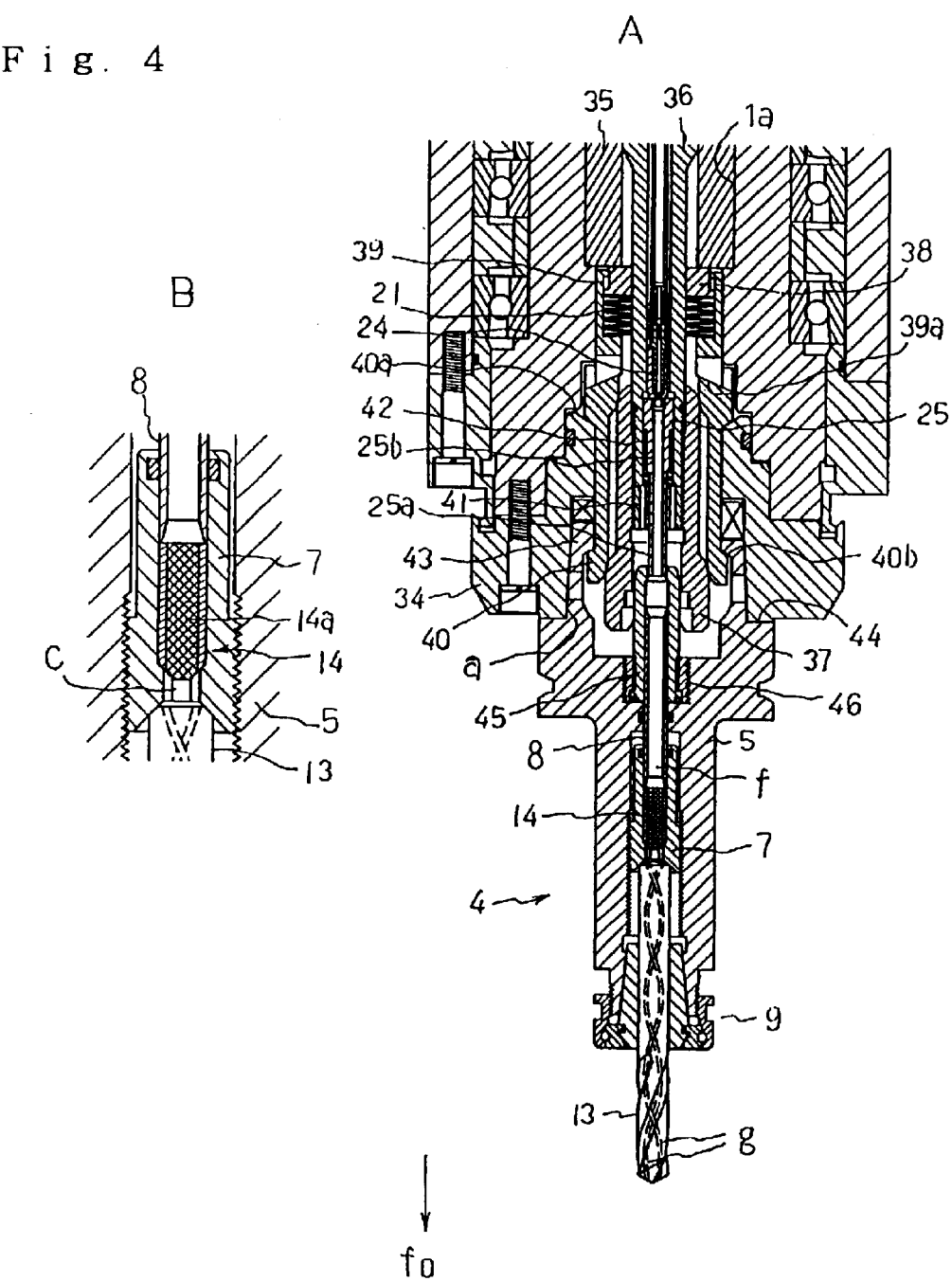
FIG. 4 illustrates a spindle device of a machine tool concerning the fourth embodiment of the invention.

Next, the fourth embodiment of the invention will be explained. FIG. 4 is a sectional view from a side sight, which illustrates a spindle device of a machine tool concerning this embodiment.

As shown in the figure, the front of the central hole 1a of the spindle 1 forms into a stepped hole part, and a ring-shape support member 34 is fitly inserted and bolted therein. An inner hole of the support member 34 forms into a taper hole "a". A cylindrical guide member 35 is fixedly fitted in the central hole 1a of the spindle 1. A draw bar 36 is inserted into an inner hole of the guide member 35 movably in a longitudinal direction.

A cylindrical clamp member 37 screws on the tip of the draw bar 36. A spring receptacle member 38 is inserted in the central hole 1a between the clamp member 37 and the guide member 35, and besides, a cylindrical press member 39 is inserted therein movably in a longitudinal direction. Besides, a collet 40 is installed between a peripheral surface of the press member 39 and a peripheral wall of the central hole 1*a*. The posterior part of the inner hole of the press member 39 is made with a large-diameter compared with the anterior part thereof. The compressed disk spring group 21 is installed before the receptacle member 38 within the posterior part. Here, the spring group 21 presses the press member 39 to the front f0 by spring force. Besides, a front slant surface 39*a* of the press member 39 presses a rear slant surface 40*a* of the collet 40. The pressure of the press member 39 shrinks a diameter of the anterior part of the collet 40. In this case, 41 is a lock screw member screwed on a female screw formed to the central hole of the clamp member 37, which fixedly joints the clamp member 37 and the draw bar 36.

The draw bar 36 has a central hole and the generator 24 is fixedly provided to the interior thereof. The central hole 1*a* before the generator 24 is made with large-diameter part and the valve 25 is installed thereon movably in a longitudinal direction. The periphery of the valve 25 forms into a stepped surface. The foremost narrow-diameter part 25*a* is inserted into a central hole of the screw member 41 movably in a longitudinal direction. Besides, a compressed spring 42 is installed behind the screw member 41 between an intermediate part 25*b* and the peripheral wall of the central hole 1*a* so as to press the valve 25 backward.

The tool holder 4 is a two-plane constrained HSK type having a taper shaft part 43 and a radial surface 44. An extended connecting passage member 45 is inserted in the rear end of the inner hole "b" of the holder body 5 at a front end surface within an inner hole of the taper shaft part 43 and the tool holder 4 is fixed on the holder body 5 through a cylindrical screw member 46.

In the above-mentioned construction, when installing the tool holder 4 separated from the spindle 1 thereon, the taper shaft part 43 is inserted into the taper hole "a" of the spindle 1 side under the draw bar 36 and the clamp member 37 moving to the front f0, and the radial surface 44 is closely connected with the front end surface of the support member 34 as shown in FIG. 4A. In this case, the tip of the thin-diameter part 25*a* of the valve 25 is smoothly inserted into an inner hole of the posterior part of the connecting pipe 45 of the tool holder 4 side.

Then, the draw bar 36 is drawn and moved backward. Therefore, an anterior enormous part of the clamp member 37 pushes and moves an interior surface of the front end of the collet 40 outside the radial direction of the spindle and an exterior slant surface 40*b* of the tip of the collet 40 is pressed to an interior slant surface of the rear end of the taper shaft part 43. This pressure generates power to draw the taper shaft part 43 backward. The taper shaft part 43 is pressed to the taper hole "a" of the spindle 1 side, and simultaneously the radial surface 44 is pressed to the front end surface of the support member 34. Therefore, the tool holder 4 is firmly fixed on the spindle 1.

On the other hand, when separating the tool holder 4 fixed on the spindle 1 therefrom, the draw bar 36 and the clamp member 37 are moved to the front f0. Therefore, the collet 40 shall not bind the interior surface of the taper shaft part 43. Under this state, the tool holder 4 is drawn to the front f0, separating from the spindle 1 side.

In the above-mentioned construction, the central hole of the valve 25 serves as a spindle side atomized cutting fluid passage e1, and besides, the inner hole of the connecting member 45, the inner hole "f" of the holder inside connecting pipe 8, the inner hole "c" of the adjusting screw 7 and the holder inside passage "g" formed the thickness of the tool device 13 serve as a tool holder side atomized cutting fluid passage e2.

Besides, in this embodiment, the transmission layer part 14 is provided inside the tool holder 4. The transmission layer part 14 is what the columnar member 14*a* such as shown in the first embodiment is innerly fitted and fixed between the connecting pipe 8 and the tool device 13 within the inner hole "c" of the adjusting screw 7.

In use of the above-mentioned spindle device, the supply of the atomized cutting fluid and so on is carried out in accordance with the second embodiment.

Figure 5:
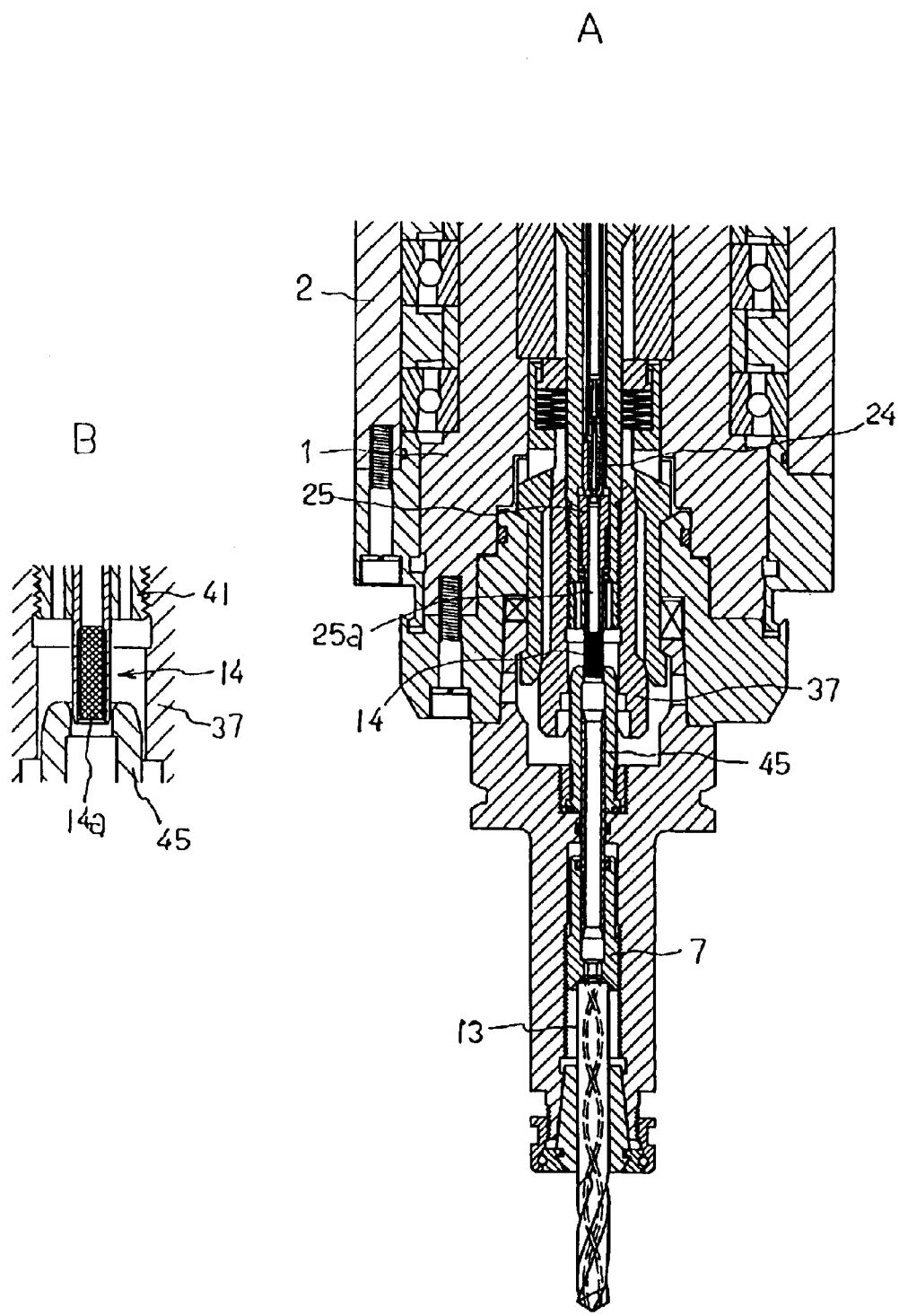
FIG. 5 illustrates a modified example of the fourth embodiment.

FIG. 5 illustrates a modification of this embodiment. In this modification, the transmission layer part 14 is provided between the generator 24 and the tool holder 4 within the spindle 1. Concretely, the columnar member 14*a* such as shown in the first embodiment is innerly fitted and fixed inside the inner hole of the anterior thin-diameter part 25*a* of the valve 25. On the other hand, the transmission layer part 14 inside the tool holder 4 is removed.

Figure 6:
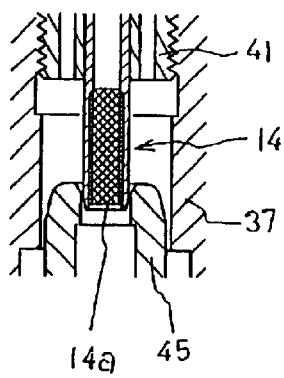
FIG. 6 illustrates another modified example of the fourth embodiment.
Figure 6:
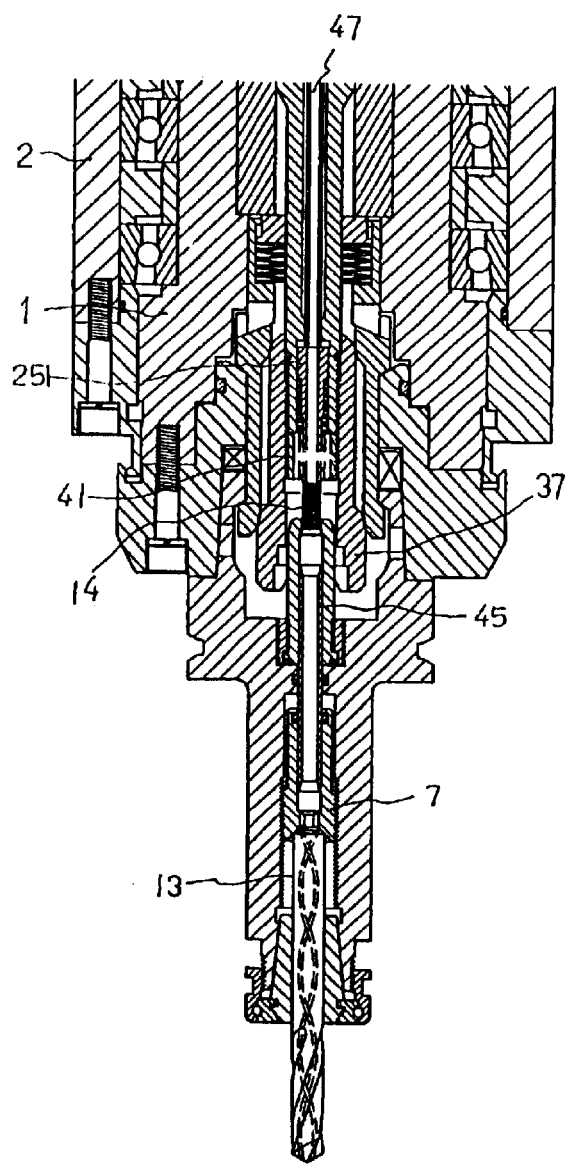

FIG. 6 illustrates an another modification of this embodiment. In this modification, the generator 24 and the supply passages for supplying the compressed air and the cutting fluid are removed. An inner pipe 47 is provided inside the central hole of the draw bar 36 integrally. Besides, instead of the valve 25, an extended connecting pipe member 251 in the same shape with the valve 25 is inserted inside the anterior large-diameter part of the central hole of the draw bar 36 movably in a longitudinal direction. While the tool holder 4 is fixed on the spindle 1, a front end surface of the inner pipe 47 is pressed on a rear end surface of the connecting pipe member 251 by the spring 42 and an inner hole of the inner pipe 47 is connected to an inner hole of the connecting pipe member 251.

In use of the above-mentioned spindle device, the supply of the atomized cutting fluid and so on is carried out in accordance with the first embodiment.

Figure 7:
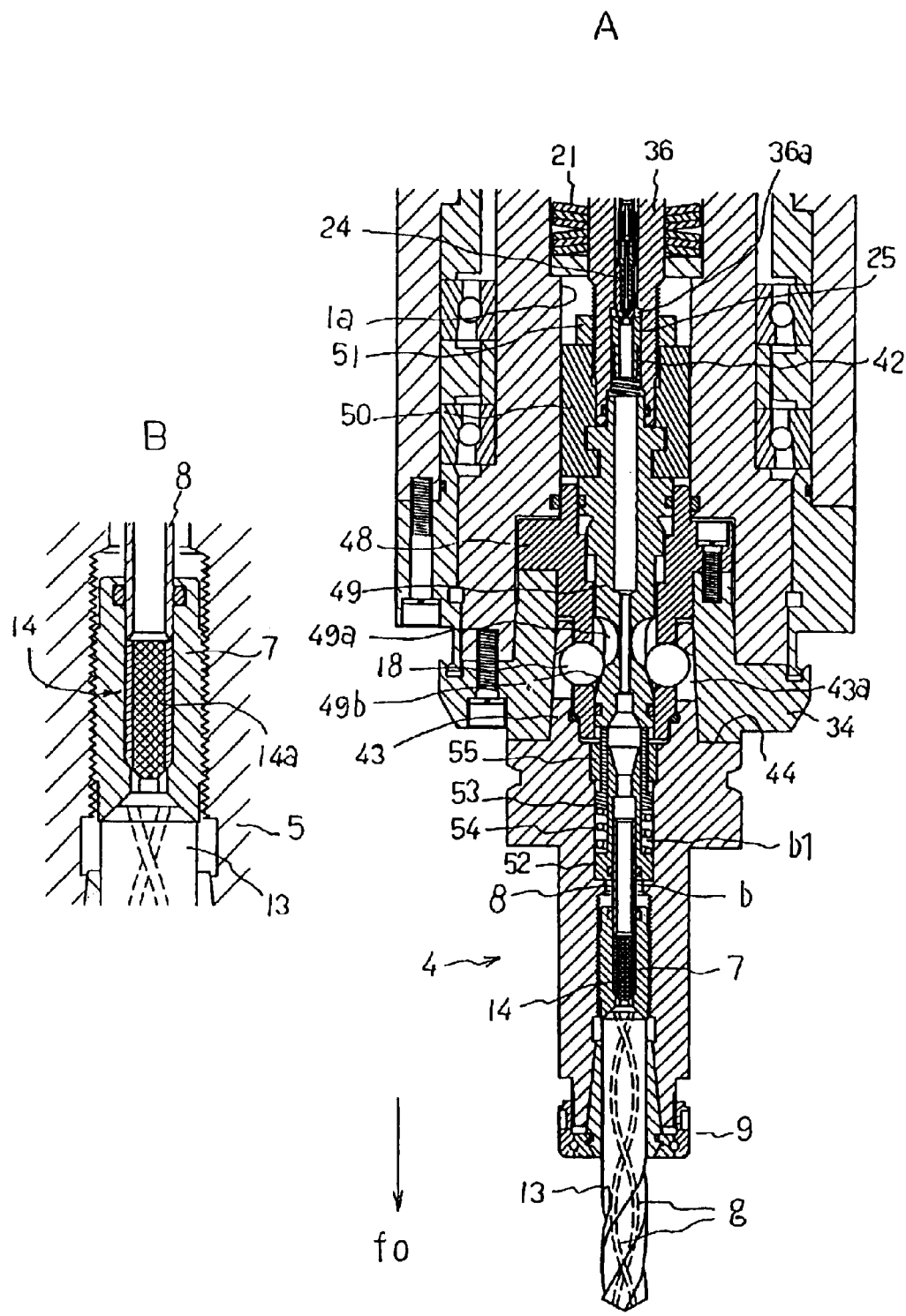
FIG. 7 illustrates a spindle device of a machine tool concerning the fifth embodiment of the invention.

Next, the fifth embodiment of the invention will be explained. FIG. 7 is a sectional view from a side sight illustrating a spindle device of a machine tool concerning this embodiment.

In the figure, the anterior part of the central hole 1*a* of the spindle 1 is made a large-diameter part into which the support member 34 is fitly inserted and bolted. A cylindrical canister 48 is concentrically bolted to the backside of the support member 34. A clamp member 49 is inserted into an inner hole of the canister 48 movably in a longitudinal direction. A hemispheric hollow 49*a* and a slant surface 49*b* are provided to the periphery of the clamp member 49 in relation to the spherical member 18.

The draw bar 36 is inserted in the central hole 1*a* of the spindle 1 movably in a longitudinal direction and fitly connected to a rear end of the clamp member 49 through a cylindrical connecting member 50 and a lock nut 51 screwed on the tip thereof. The compressed disk spring group 21 is installed between the peripheral wall of the central hole 1*a* of the spindle 1 and the draw bar 36 to press the draw bar 36 backward.

The atomized cutting fluid generator 24 is fixedly provided inside the central hole 36*a* of the draw bar 36. The anterior part of the central hole 36*a* is made a large-diameter part into which the valve 25 is inserted movably in a longitudinal direction. The compressed spring 42 is installed in the central hole 36*a* between the valve 25 and the rear end surface of the clamp member 49 and the valve 25 is pressed backward by elasticity. The central hole 36a of the draw bar 36 and the inner hole of the valve 25 are connected in a straight line.

The posterior part of the inner hole "b" of the tool holder 4 of a two-plane constrained KM type is made a large-diameter part b1 into which a passage member 52 connected with the posterior part of the holder inside connecting pipe 8 is inserted. Besides, a mouthpiece 53 is extrapolated to a thin-diameter part of the passage member 52 movably in a longitudinal direction. A compressed spring 54 is installed into the large-diameter part b1 between the mouthpiece 53 and the passage member 52. Here, elasticity of the spring 54 presses the mouthpiece 53 backward, and besides, fixes an engaging ring member 55 on the rear end of the large-diameter part b1 so as to regulate the mouthpiece 53 from getting out of the large-diameter part b1.

In the above-mentioned construction, when installing the tool holder 4 separated from the spindle 1 thereon, the taper shaft part 43 of the tool holder 4 is inserted into the taper hole "a" of the spindle 1 side under the draw bar 36 and the clamp member 49 moving to the front f0. Here, as shown in FIG. 7A, a radial surface 44 is closely connected to a front end surface of the support member 34. In this case, the spherical member 18 moves inside a radial direction of the spindle so as to enter the hemispheric hollow 49a of the clamp member 49, and the taper shaft part 43 of the tool holder 4 is allowed to enter the taper hole "a" of the spindle 1 side.

Then, the draw bar 36 is drawn and moved backward. The slant surface 49b of the clamp member 49 pushes and moves each spherical member 18 outside the radial direction of the spindle 1 side, thereby pressing the spherical member 18 to a slant surface of an engaging hole 43a of the peripheral wall of the taper shaft part 43 as shown in FIG. 7A. The pressure generates power to draw the taper shaft part 43 backward. The taper shaft part 43 is pressed to the taper hole "a" of the spindle 1 side, and simultaneously, the radial surface 44 is pressed to the front end surface of the support member 34. Therefore, the tool holder 4 is firmly fixed on the spindle 1.

On the other hand, when separating the tool holder 4 fixed on the spindle 1 therefrom, the draw bar 36 and the clamp member 37 are moved to the front f0. Therefore, each spherical member 18 moves inside the radial direction of the spindle and enters the hemispheric hollow 49a; as a result, the taper shaft part 43 is not bound. Under this state, the tool holder 4 is drawn to the front f0, separating from the spindle 1 side.

In the above-mentioned construction, the inner hole of the valve 25 and the central hole of the clamp rod 49 serve as a spindle side atomized cutting fluid passage e1. Besides, an inner hole of the mouthpiece 53, an inner hole of the passage member 52, the inner hole "f" of the connecting pipe 8, the inner hole "c" of the adjusting screw 7 and the holder inside passage "g" formed to the thickness of the tool device 13 serve as a tool holder side atomized cutting fluid passage e2.

Besides, in this embodiment, the transmission layer part 14 is provided inside the tool holder 4. The transmission layer part 14 is made in accordance with the fourth embodiment.

Besides, in use of the above-mentioned spindle device, the supply of the atomized cutting fluid and so on is carried out in accordance with the second embodiment.

Figure 8:
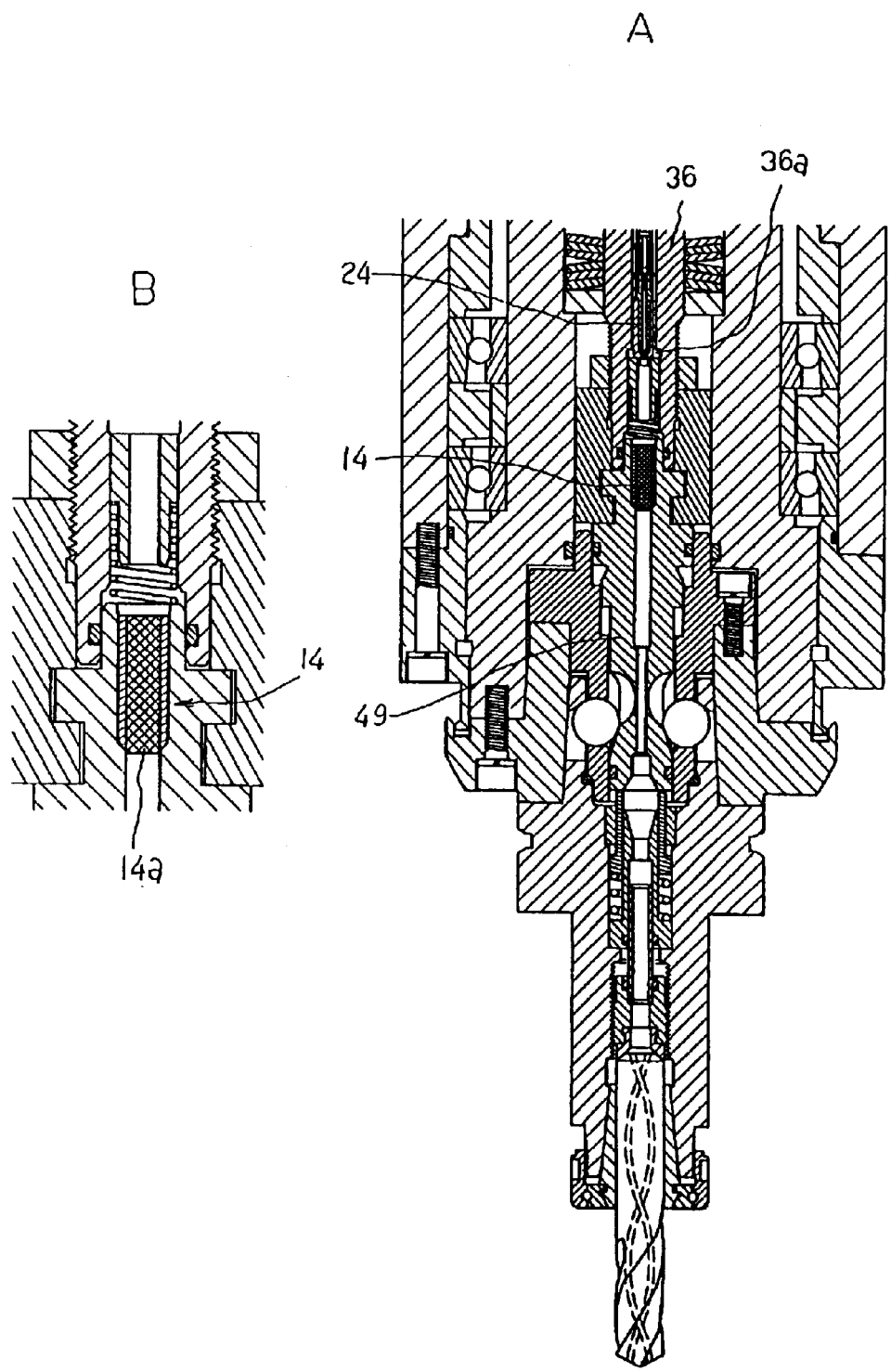
FIG. 8 illustrates a modified example of the fifth embodiment.

FIG. 8 illustrates a modification of this embodiment. In this modification, the transmission layer part 14 is provided between the generator 24 and the tool holder 4 within the spindle 1. Concretely, the columnar member 14a such as shown in the first embodiment is innerly fitted and fixed inside the posterior part of the central hole of the clamp member 49. On the other hand, the transmission layer part 14 inside the tool holder 4 is removed.

Figure 9:
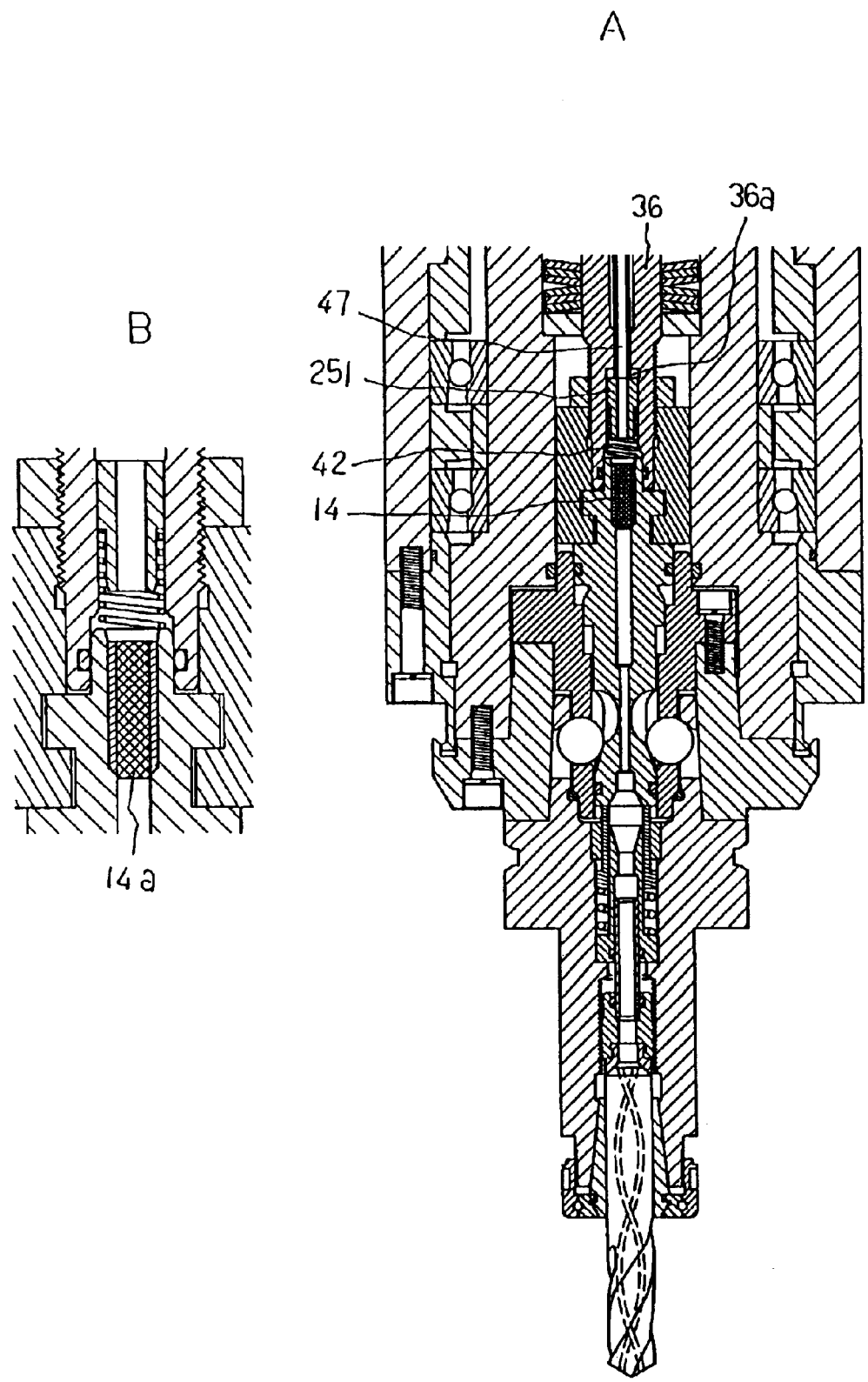
FIG. 9 illustrates another modified example of the fifth embodiment.

FIG. 9 illustrates an another modification of this embodiment. In this modification, the generator 24 and the supply passages for supplying the compressed air and the cutting fluid are removed. The inner pipe 47 is provided inside the central hole of the draw bar 36 integrally. Besides, instead of the valve 25, the extended connecting pipe member 251 in the same shape with the valve 25 is inserted inside the large-diameter part of the anterior part of the central hole of the draw bar 36 movably in a longitudinal direction. Here, the front end surface of the inner pipe 47 is pressed on the rear end surface of the connecting pipe member 251 by the spring 42, thereby connecting the inner hole of the inner pipe 47 to the inner hole of the clamp member 49. In use of the above-mentioned spindle device, the supply of the atomized cutting fluid and so on is carried out in accordance with the first embodiment.

Figure 10:
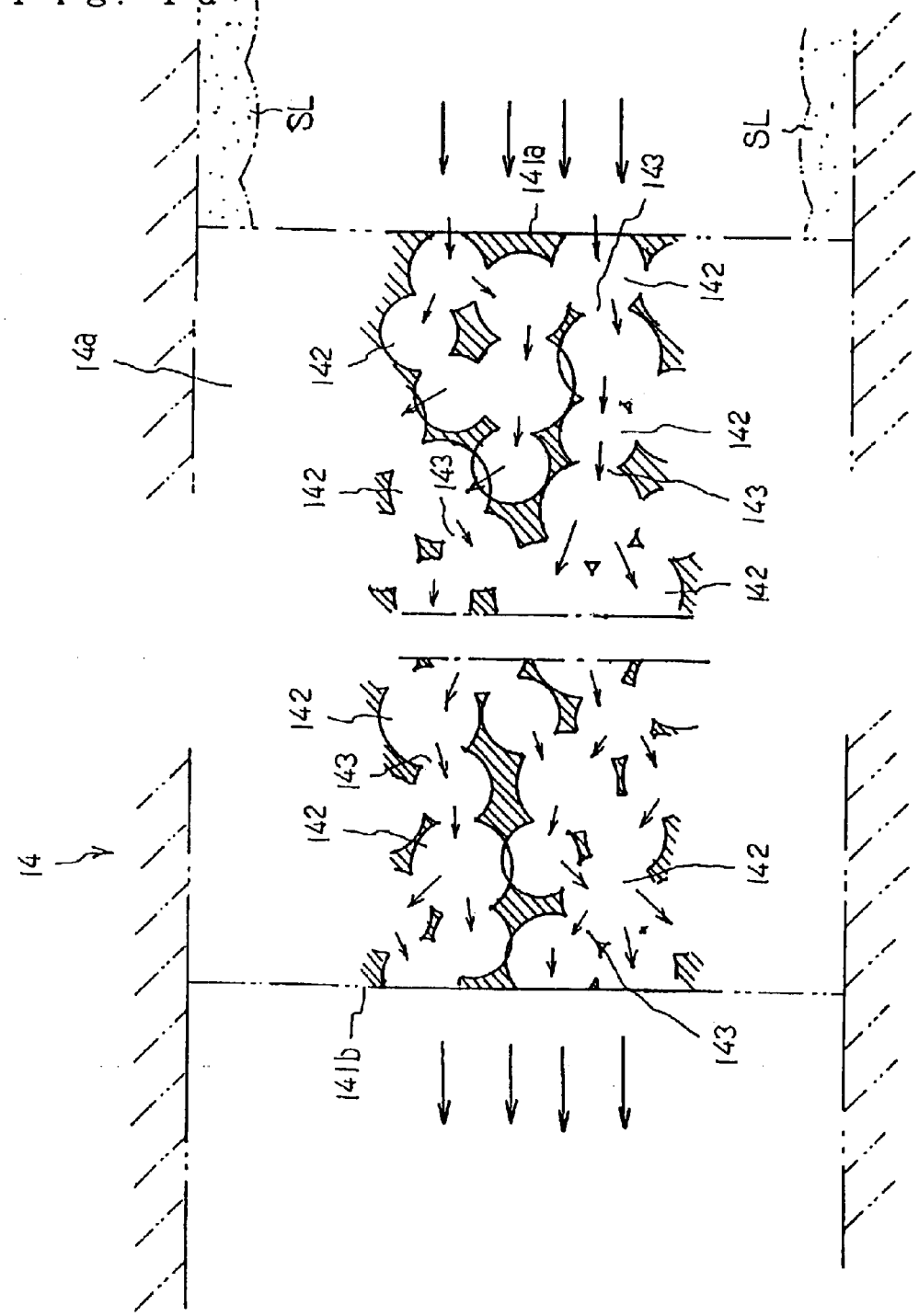
FIG. 10 is a sectional explanatory view showing a flow state of atomized cutting fluid in a vacant chamber group transmission layer part of each of the above-mentioned embodiments.
Figure 11:
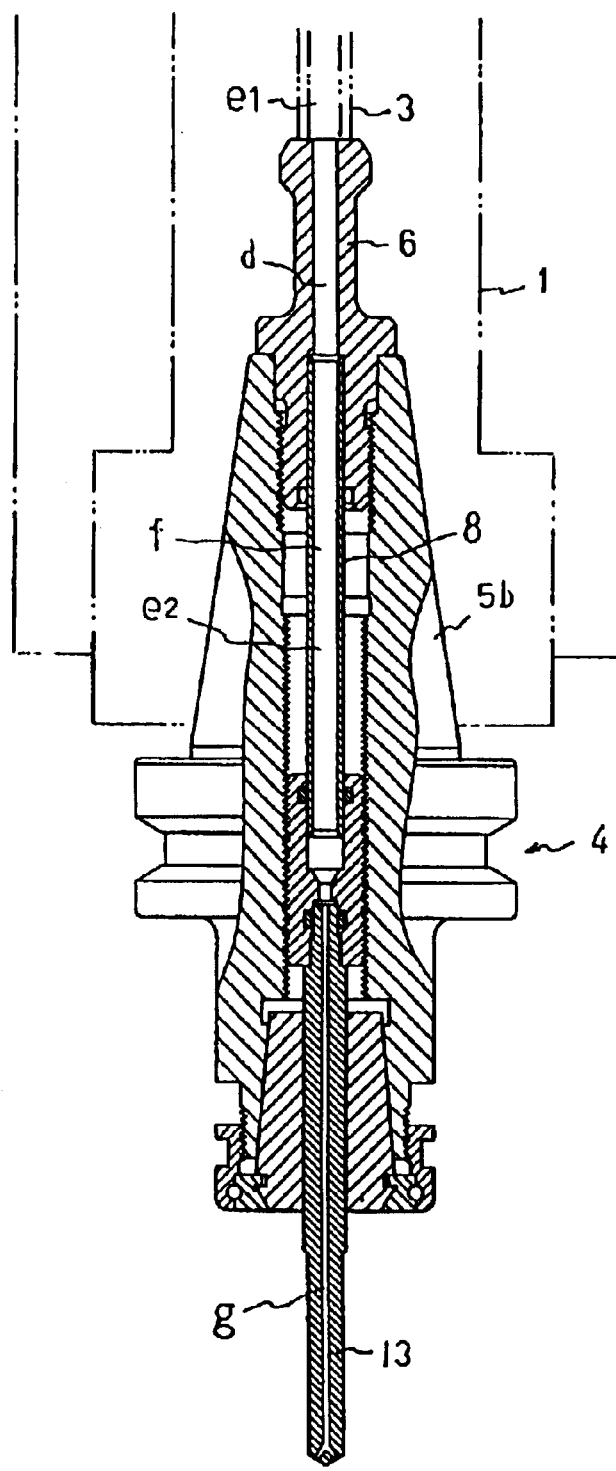
FIG. 11 is a sectional view from a side sight of a spindle device of conventional examples.

Next, in each of the above-mentioned embodiments, fluidity that the atomized cutting fluid passes around the transmission layer part 14 will be explained with reference to FIG. 10. Here, FIG. 10 is an explanatory view showing the fluidity of the atomized cutting fluid in the transmission layer part 14 of the above-mentioned each embodiment.

While the spindle 1 is rotating, the atomized cutting fluid supplied into the passage e1 with an adequate pressure (for example, about 0.3 Mpa) reaches the transmission layer part 14 through the passage e1 or e2. The atomized cutting fluid enters the transmission layer part 14 from a cutting fluid entrance surface 14 1a thereof. Then the atomized cutting fluid flows from each vacant chamber 142 one by one towards the downstream side to the anterior vacant chamber 142 through an atomized cutting fluid entrance 143 thereof. During flowing, each vacant chamber 142 is filled and accumulated with the atomized cutting fluid with comparative high pressure related to a supply pressure of the atomized cutting fluid. Thus, when the fluidity of the atomized cutting fluid inside the transmission layer part 14 progresses, the atomized cutting fluid reaches a cutting fluid exit surface 141b and the cutting device 13 through the passage e1 or e2 as decreasing in pressure somewhat, spouting from the tip thereof. When such the fluidity continues, the atomized cutting fluid continuously spouts from the tip of the tool device 13.

By the way, the rotating speed of the spindle 1 usually varies according to the diameter of a tool device for machining, and sometimes increases greatly. In this case, the atomized cutting fluid flowing inside the passages e1 and e2 gains enough centrifugal force correspondent to the rotating speed of the spindle 1. In connection with this, the atomized cutting fluid near the peripheral wall of the passages e1 and e2 increases in the pressure, thereby promoting liquefying.

When cutting fluid SL inside the atomized cutting fluid passages is increased by the promotion of the liquefaction, an effective passage section area of the passages e1 and e2 is decreased and the fluidity of the atomized cutting fluid is restricted. Therefore, the atomized cutting fluid decreases in pressure greatly until it reaches the transmission layer part 14.

Thus pressure dropped atomized cutting fluid is prevented from entering from the entrance 141a of the transmission layer part 14, thereby decreasing in the pressure inside the passages e1 and e2 of the exit side 141b thereof. When such a tendency starts occurring, the atomized cutting fluid with the comparative high pressure accumulated into each the vacant chamber 142 inside the transmission layer part 14 escapes under an expansion being restricted without momentarily expanding to the maximum.

As the result, though the atomized cutting fluid which enters the transmission layer part 14 is decreased, an amount of atomized cutting fluid than the entering atomized cutting fluid flows into the passage e1 or e2 of the exit side 141b of the transmission layer part 14, acting so as to prevent from decreasing in pressure. Therefore, a downward tendency of the spouting amount resulting from liquefaction that the atomized cutting fluid spouts from the tip of the tool device 13 due to a temporary rotation rise of the spindle 1 is eased.

On the other hand, the pressure of the atomized cutting fluid supplied into the passage e1 of the spindle 1 side becomes high temporarily, and the supply amount is increased. However, in this case, an amount of atomized cutting fluid is accumulated into the vacant chambers 142 group of the transmission layer part 14, thereby temporarily preventing the increase of escaping amount from the exit 141b of the transmission layer part 14. Therefore, a temporary upward tendency of the spouting amount that the atomized cutting fluid spouts from the tip of the tool device 13 is eased. Such a mitigation of the upward tendency contributes to economy of atomized cutting fluid.

Accordingly, the vacant chambers of the transmission layer part 14 function as a buffer, which prevents a variation in temporary fluidity that occurs in the downstream side of the transmission layer part 14 resulting from the liquefaction inside the passage e1 or e2. Therefore, the spout of the atomized cutting fluid from the tip of the tool device 13 is stabilized.

The variation in temporary fluidity in an actual machining generally occurs due to the rotation rise of the spindle 1 which occurs over a range of short term below 2 seconds, and the vacant chambers 142 of the transmission layer part 14 act thereupon effectively.

Besides, during use of the machine tool, while a work is not cut or when the spindle is stopped rotating, the supply of the atomized cutting fluid into the passage e1 is stopped. However, in this case, the atomized cutting fluid remained in the passage e1 tends to be temporarily prevented escaping to the downstream side of the transmission layer part 14 by an action as the buffer. In addition, the atomized cutting fluid inside the passages e1 and e2 is accumulated in the vacant chambers group, and the cutting fluid SL liquefied inside the passage e1 or e2 also enters and stays in the vacant chambers 142. Therefore, the atomized cutting fluid and the liquefied cutting fluid SL are prevented escaping from the tip of the tool device 13 without resistance in vain.

Besides, the atomized cutting fluid accumulated into the transmission layer part 14 because of stopping the supply and the liquefied cutting fluid escape toward the downstream side of the transmission layer part 14, spouting from the tip of the tool device 13 in misty by the pressure of the supplied atomized cutting fluid before reaching the transmission layer part 14 just after beginning to be supplied into the passage e1. The spouted atomized cutting fluid makes up decrease in density of the atomized cutting fluid that spouts from the tip of the tool device 13 just after beginning to be supplied, thereby stabilizing the spout.

Even if the discharge of atomized cutting fluid inside the atomized cutting fluid passages varies temporarily by changes of the rotating speed of the spindle, the vacant chambers group of the vacant chamber group transmission layer part acts as a buffer to ease the variation and lets the atomized cutting fluid spout stably. Therefore, a life of a tool device is extended, machining accuracy and quality are improved, and besides, cutting fluid is economized.

Besides, during use of the machine tool, though the atomized cutting fluid is stopped and re-started being supplied into the atomized cutting fluid passages repeatedly, since the atomized cutting fluid of the upstream side of the vacant chamber group transmission layer part and the liquefied cutting fluid are accumulated into the vacant chamber group transmission layer part when the supply is stopped, they are effectively prevented from escaping in vain. In addition, the density of the atomized cutting fluid spouted from the tip of the tool device just after re-starting the supply prevents from decreasing in cutting fluid density excessively by the atomized cutting fluid escaping from the vacant chamber group transmission layer part and the liquefied cutting fluid. Accordingly, a time-variation of the density of the atomized cutting fluid spouted from the tip of the tool device is prevented.

The time to ease a temporary variation in fluidity of the atomized cutting fluid is extended.

The vacant chamber group transmission layer part can be easily formed strong.

The inside structure of the spindle side can be prevented from complication.

Various devices installed on the spindle and associated members can gain an effect based on the vacant chamber group transmission layer part for each tool device even if they are not alterable. Total cost to gain the effect is cheaper in comparison with the case that the vacant chamber group transmission layer part is provided to each of the various tool devices and associated members.

The atomized cutting fluid passages are shortened and liquefying amount of the atomized cutting fluid is decreased, thereby effectively making the atomized cutting fluid spout from the tool device stably.

What is claimed is:

1. A spindle device of a machine tool comprising:
   a spindle;
   a tool device integrally installed on said spindle and having a tip;
   atomized cutting fluid passages each having a single passage cross section formed in an area ranging from the spindle to the tip of the tool device 13; and
   a vacant chamber group transmission layer part formed in the middle of one of the atomized cutting fluid passages,
   wherein atomized cutting fluid supplied to the vacant chamber group transmission layer part from the spindle side spouts from the tip of the tool device and the vacant chamber group transmission layer part has a large number of vacant chambers stacked thereon in multiple stages or in the state of communicating with each other and allows the atomized cutting fluid to pass through groups of the vacant chambers.

2. A spindle device of a machine tool as claimed in claim 1, wherein the vacant chambers are mutually communicated with each other through small entrances.

3. A spindle device of a machine tool as claimed in claim 1, wherein the vacant chamber group transmission layer part is made of sintered metal.

4. A spindle device of a machine tool as claimed in claim 1, wherein the vacant chamber group transmission layer part is provided inside a tool holder that fixes the tool device on the spindle.

5. A spindle device of a machine tool as claimed in claim 1, wherein the vacant chamber group transmission layer part is provided inside the spindle.

6. A spindle device of a machine tool as claimed in claim 1, wherein an atomized cutting fluid generator is provided inside the spindle, and the vacant chamber group transmission layer part is provided between the generator and a tool holder that fixes the tool device on the spindle.

7. A spindle device of a machine tool comprising:

a spindle;

a tool device installed on said spindle;

an atomized cutting fluid passage extending from the spindle to the tool device;

a vacant chamber group transmission layer part formed in the atomized cutting fluid passage; and a flow of atomized cutting fluid in the atomized cutting fluid passage in a direction from the spindle to the tool device, wherein the atomized cutting fluid flows into the vacant chamber group transmission layer part and subsequently to the tool device, and the vacant chamber group transmission layer part has a large number of vacant chambers arranged in multiple stages or in the state of communicating with each other and allows the atomized cutting fluid to pass through the vacant chambers.

8. A spindle device of a machine tool as claimed in claim 7, wherein the vacant chambers are mutually communicated with each other through entrances that are smaller in area than are sections through portions of the vacant chambers other than the entrances.

9. A spindle device of a machine tool as claimed in claim 7, wherein the vacant chamber group transmission layer part is made of sintered metal.

10. A spindle device of a machine tool as claimed in claim 7, wherein the vacant chamber group transmission layer part is provided inside a tool holder that fixes the tool device on the spindle.

11. A spindle device of a machine tool as claimed in claim 7, wherein the vacant chamber group transmission layer part is provided inside the spindle.

12. A spindle device of a machine tool as claimed in claim 7, wherein an atomized cutting fluid generator is provided inside the spindle, and the vacant chamber group transmission layer part is provided between the generator and a tool holder that fixes the tool device on the spindle.

13. A spindle device of a machine tool as claimed in claim 7, wherein the vacant chambers are arranged in stages that are in series with respect to the flow of atomized cutting fluid.

* * * * *